United States Patent [19]

Jeong et al.

[11] Patent Number: 5,471,268
[45] Date of Patent: Nov. 28, 1995

[54] CHARACTER IMPRINTING DEVICE FOR A CAMERA

[75] Inventors: Yong-joon Jeong; Myung-je Park; Kang-won Lee; Heui-seong Park, all of Kyeongsangnam-do, Rep. of Korea

[73] Assignee: Samsung Aerospace Industries, Ltd., Kyeongsangnam-do, Rep. of Korea

[21] Appl. No.: 348,754

[22] Filed: Dec. 2, 1994

Related U.S. Application Data

[63] Continuation of Ser. No. 144,821, Oct. 28, 1993, abandoned.

[30] Foreign Application Priority Data

| Nov. 3, 1992 | [KR] | Rep. of Korea | 92-24114 U |
| Dec. 1, 1992 | [KR] | Rep. of Korea | 92-24114 |
| Apr. 14, 1993 | [KR] | Rep. of Korea | 93-6235 |

[51] Int. Cl.⁶ ............................................. G03B 17/24
[52] U.S. Cl. .................................... 354/106; 354/108
[58] Field of Search .............................. 354/105, 106, 354/296, 125, 108

[56] References Cited

U.S. PATENT DOCUMENTS

| 4,402,588 | 9/1983 | Khait et al. | 354/106 |
| 5,028,942 | 7/1991 | Kirigaya | 354/106 |
| 5,119,119 | 6/1992 | Amano et al. | 354/106 |
| 5,126,773 | 6/1992 | Oho et al. | 354/106 |
| 5,128,708 | 7/1992 | Murayama et al. | 354/430 |
| 5,144,348 | 9/1992 | DiSanzo et al. | 354/108 |
| 5,148,197 | 9/1992 | Kunishige | 354/106 |
| 5,182,590 | 1/1993 | Kaihara et al. | 354/106 |
| 5,204,707 | 4/1993 | Harvey | 354/75 |
| 5,245,373 | 9/1993 | Ogawa et al. | 354/106 |
| 5,249,008 | 9/1993 | Mauchan | 354/108 |
| 5,253,001 | 12/1993 | Alyfuku et al. | 354/106 |
| 5,276,470 | 1/1994 | Fridman | 354/106 |

FOREIGN PATENT DOCUMENTS

| 53-33617 | 3/1978 | Japan . |
| 58-144821 | 8/1983 | Japan . |
| 61-18938 | 1/1986 | Japan . |
| 62-112139 | 5/1987 | Japan . |
| 63-92939 | 4/1988 | Japan . |
| 186124 | 3/1989 | Japan . |

*Primary Examiner*—Michael L. Gellner
*Assistant Examiner*—Nicholas J. Tuccillo
*Attorney, Agent, or Firm*—Francis C. Hand

[57] ABSTRACT

The character imprinting device employs an LED for emitting a light through a mask having characters of various colors thereon for imprinting on a film. In one embodiment, a focusing unit is provided for focusing the light emitted through a lens through a data display plate for imprinting of characters onto a film. In still another embodiment, use is made of a rotatable data display plate which can be manually actuated via a gear on the outside of the camera. A carrier is also provided for housing a data display plate between two interengaged transparent covers.

5 Claims, 6 Drawing Sheets

CHARACTER IMPRINTING DEVICE FOR A CAMERA

This is a continuation of application Ser. No. 08/144,821 filed on Oct. 28, 1993 now abandoned.

This invention relates to a character imprinting device for a camera.

BACKGROUND OF THE INVENTION

Herefore, cameras have been known which can print simple characters or dates on a film as well as light information as desired by the user.

For example, as illustrated in FIG. 1, cameras have been provided with a character imprinting device which can be mounted within a camera body. Generally, such a device employs a light emitting lamp 12, a reflecting mirror 14 for changing the direction of light from the light emitting lamp 12 and a character-signal Liquid Crystal Display (LCD) 15. Usually, a module 16 is provided to mount the lamp 12, deflecting mirror 14 and character-signal LCD on a rear cover 11 of the camera while also shading the device from ambient light. In addition, a film presser 17 is attached to the rear cover 11 and a film 18 is moved passed the character-signal LCD 15. An outer-signal Liquid Crystal Display (LCD) 13 is also attached to the rear cover 11.

Referring to FIG. 2, the drive circuit for a character imprinting device as illustrated in FIG. 1 generally comprises: a micro-controller 21; a mode selecting switch block SW1—SW3 connected between a ground and an input terminal of the micro-controller 21; a light emitting lamp drive circuit 22 connected to an output terminal of the micro-controller 21 and, via an output terminal, to the light emitting lamp 12; and an LCD drive circuit 23 connected to an output terminal of the micro-controller 21 and, via an output terminal, to the outer-signal LCD 13 and character-signal LCD 15.

When a user intends to imprint characters, such as a data, time or a simple message on a film while a film is inserted, the user selects one of the modes displayed at the outer-signal LCD 13 via the operating mode selecting switches SW1—SW3. Secondly, depending on the signal of the mode selecting switches, the micro-controller 21 makes the outer-signal LCD 13 and the character-signal LCD 15 display the selected characters, through the LCD drive circuit 23 such as;

1) year, month, date
2) month, date, year
3) date, month, year
4) date, time, minute
5) simple Alphabets
6) selecting mode off Thirdly, one of the above mentioned display modes is selected and displayed at the character-signal LCD 15. The characters displayed at the character-signal LCD 15 are projected onto the film by the light emitted from the light emitting lamp 12 and reflected by the reflecting mirror 14. The characters are thus imprinted at a predetermined area of a photograph, generally at a lower right area.

However, character imprinting devices of the above type are relatively limited due to the use of an LCD device. In particular, intricate and elaborate characters or symbols cannot be readily expressed. Further, since a light emitting diode is usually used, the imprinted characters are not colored but rather are monochrome. Still further, since these devices use an LED and an LCD drive circuit, the devices have been too expensive to be employed in a general camera.

SUMMARY OF THE INVENTION

Accordingly, it is an object of the invention to provide a character imprinting device of relative simple and inexpensive construction which can be employed in a conventional camera.

It is another object of the invention to be able to imprint characters of different colors and styles on a photograph when taking a photograph.

It is another object of the invention to provide a relatively simple light imprinting device which can be incorporated in a camera of relatively inexpensive construction.

Briefly, the invention provides a character imprinting device for a camera which includes a light emitting diode (LED) for emitting light in response to an actuation signal, a carrier mounting the light emitting diode thereon for disposition on a rear cover of a camera and a film presser for guiding a roll of photographic film in a path to be exposed to the light emitted from the diode. In addition, a mask support member is mounted between the presser and the light emitting diode for receiving light emitted from the diode and a character imprinting mask having a plurality of colored characters printed thereon for imaging onto the film is mounted in the mask support member.

In accordance with the invention, the character imprinting mask may be located between the mask support member and the presser. Alternatively, the mask may be located between the presser and the film or may be located between the carrier and the mask.

In addition, the character imprinting device includes a shading means between the carrier and the mask support member for shading the space between the LED and mask from outside light.

In accordance with the invention, the mask is made of one of a photographic film, a metal mask covered with a film or a glass plate coated with aluminum.

Each of the carrier and mask support member may also be provided with surfaces which are covered with grooves in a hatched manner so as to prevent light from the diode from reflecting irregularly.

In another embodiment, the character imprinting device comprises a lens for focusing an image, an exposure unit or means for adjusting the exposure quantity and time of a light entering through the lens, a guide for guiding the light passing from the exposure unit to a film and a data display plate fixed on the guide and having characters thereon for exposure to the light passing from the exposure unit to the film for imaging on the film.

In this embodiment, the data display plate may be made of a transparent material while being rotatably mounted in the path of light from the exposure unit. The transparent plate may also have a plurality of various shapes and colors of characters thereon for selective exposure to the path of light in response to rotation of the plate.

In still another embodiment, the light imprinting device may be used with a camera so as to be manually operated from the outside of the camera body. In this embodiment, the character imprinting device has a data display plate rotatably mounted in the camera body with a portion thereof in front of a film path for exposing characters thereon to a portion of a film in the film path. In addition, a rotatably mounted transmission gear is mounted in the camera body in meshing relation with the data display plate while an outer rotary plate is rotatably mounted in the camera body with a portion extending from the camera body for manual engagement thereof. The outer rotary plate is in meshing engagement with the transmission gear so that upon manual rotation of the outer rotary plate, the data display plate is caused to rotate thereby exposing different characters to the film for imprinting thereon.

In this embodiment, the data display plate may be made of a transparent material with characters of translucent colors. Alternatively, the data display plate may be made of an opaque material with characters of transparent colors or may be made of a transparent material with characters of different transparent colors.

The data display plate may also be mounted in a carrier which receives the data display plate in a manner so as to protect the plate against damage. For example, the carrier may include a pair of covers of transparent material which have interengaging projections and recesses for securing the covers together with the data display plate sandwiched therebetween.

These and other objects and advantages of the invention will become more apparent from the following detailed description taken in conjunction with the accompanying drawings wherein:

DETAILED DESCRIPTION OF THE INVENTION

It is to be noted that the term "characters" used herein means various colors of data or indicia including symbols and figures as well as characters.

Figure 1:
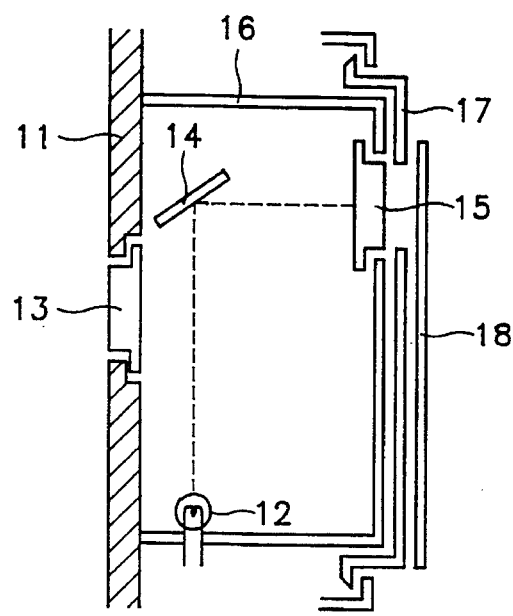
FIG. 1 illustrates a schematic side view of a character imprinting device of the prior art.
Figure 2:
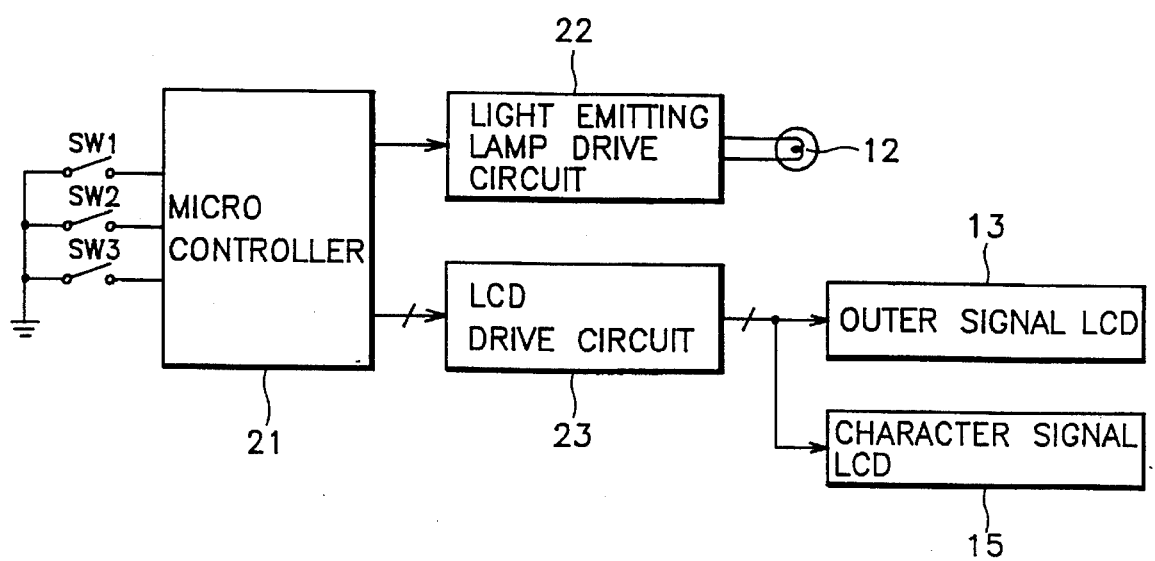
FIG. 2 illustrates a block diagram of a drive circuit for the character imprinting device of FIG. 1.
Figure 3:
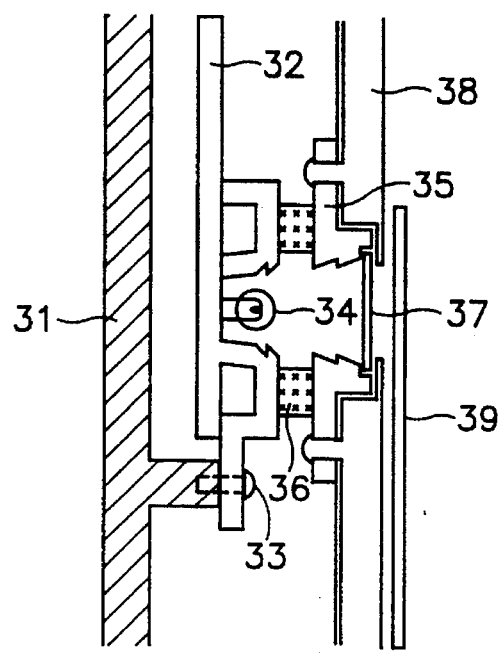
FIG. 3 illustrates a side view of a character imprinting device according to the invention.

Referring to FIG. 3, the character imprinting device is constructed for use in a camera, for example the device is mounted on a rear wall 31 of the camera. As illustrated, the character imprinting device includes a light emitting diode (for example, LED) 34 for emitting light in response to an actuation signal. This diode 34 is mounted mechanically and electrically on a carrier 32 which is secured by suitable means, such as screws 33, to the rear cover 31 of the camera.

A film presser 38 is also mounted on the rear cover 31 via suitable means (not shown) for guiding a length of photographic film 39 in a path to be exposed to the light emitted from the LED 34.

In addition, the character imprinting device has a mask support member 35 mounted on the presser 38 with a stationary character imprinting mask 37 of plate shape mounted therein for receiving and passing light emitted from the LED 34. The mask 37 includes a plurality of colored characters which are printed thereon for imaging onto the film 39.

A shade means 36, for example in the form of a sponge ring, is disposed between the carrier 32 and the mask support member 35 for shading outside light from entering therebetween.

As illustrated, the character imprinting mask 37 is located between the mask support member 35 and the film presser 38. Alternatively, the mask 37 may be located between the film presser 38 and the film 39 or between the carrier 32 and the mask support member 35 in order to place the mask 37 close to the film 39.

When a user intends to imprint a certain character or characters on the film 39 during photographing, a character imprinting switch (not shown) is turned ON in order to cause the LED 34 to emit light. The light which is emitted from the LED 34 is passed through the mask 37 to activate the film 39 so that the characters become imaged, that is, printed, on a certain area of the film 39, for example, in a lower-right hand portion of the film 39.

The mask 37 may be made of a photographic film, a metal mask covered with a film or a glass plate coated with aluminum. In any case, the mask is printed with various colors of characters or figures or any other suitable indicia which can be projected onto the film.

In order to prevent the light emitted from the LED 34 from reflecting irregularly, hatched grooves are formed in the walls and surfaces of the carrier 32 and the mask support member 35.

Figure 4:
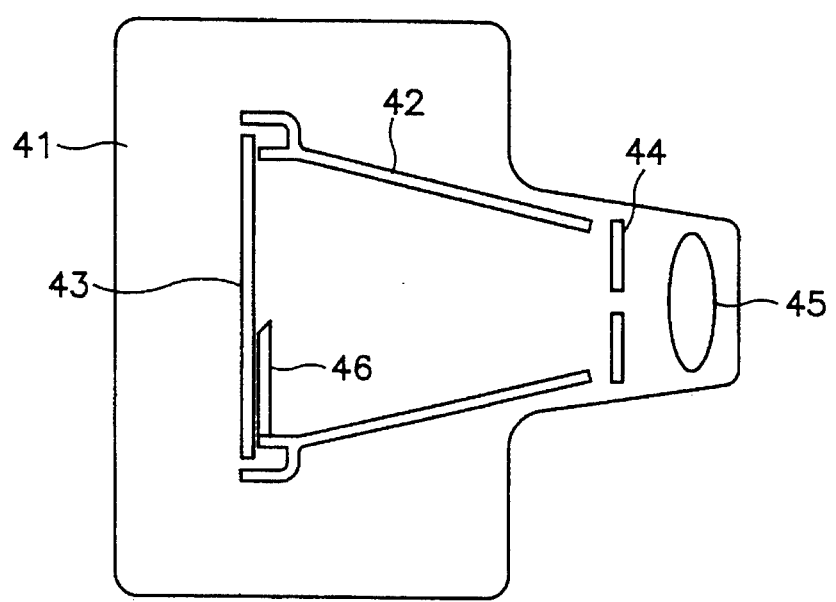
FIG. 4 illustrates a plan view of another embodiment of a character imprinting device constructed in accordance with the invention.

Referring to FIG. 4, in another embodiment, the character imprinting device employs a lens 45 for focusing an image, an exposure unit or means for adjusting the exposure quantity and time of the light entering through the lens 45 and a guide 42 for guiding the light passing from the exposure unit 44 to a film 43 located within the camera body 41. In addition, a data display plate 46 is fixed on the guide 42 and has characters thereon for exposure to the light passing from the exposure unit 44 for imaging on the film.

The data display plate 46 is made of various colors of transparent materials on which various colors of translucent characters are printed. Alternatively, the plate 46 may be made of opaque materials on which various colors of transparent characters are printed or may be made of transparent materials on which transparent characters of different colors from the plate are printed.

When a user presses a shutter switch (not shown), the light entering through the lens 45 is dimmed with proper quantity depending on the distance to an object, lightness of the object and the film sensitivity via the exposure unit 44. When the light entering inwardly passes through the data display plate 46, a transparent portion of the display plate 46 allows the light to pass but the opaque portions do not allow the light to pass. Hence, the characters printed on the data display plate 46 become exposed to and printed on the film 43. In the event that the material of the data display plate 46 is opaque and the characters are transparent, a part of the image of an object is not imprinted. Thus, it is desired to minimize the size of the data display plate 46.

In case the data display plate 46 is disposed in front of a film 43, the characters are imprinted on the film 43 more distinctly than in the case where the plate 46 is disposed behind the film 43.

Figure 5:
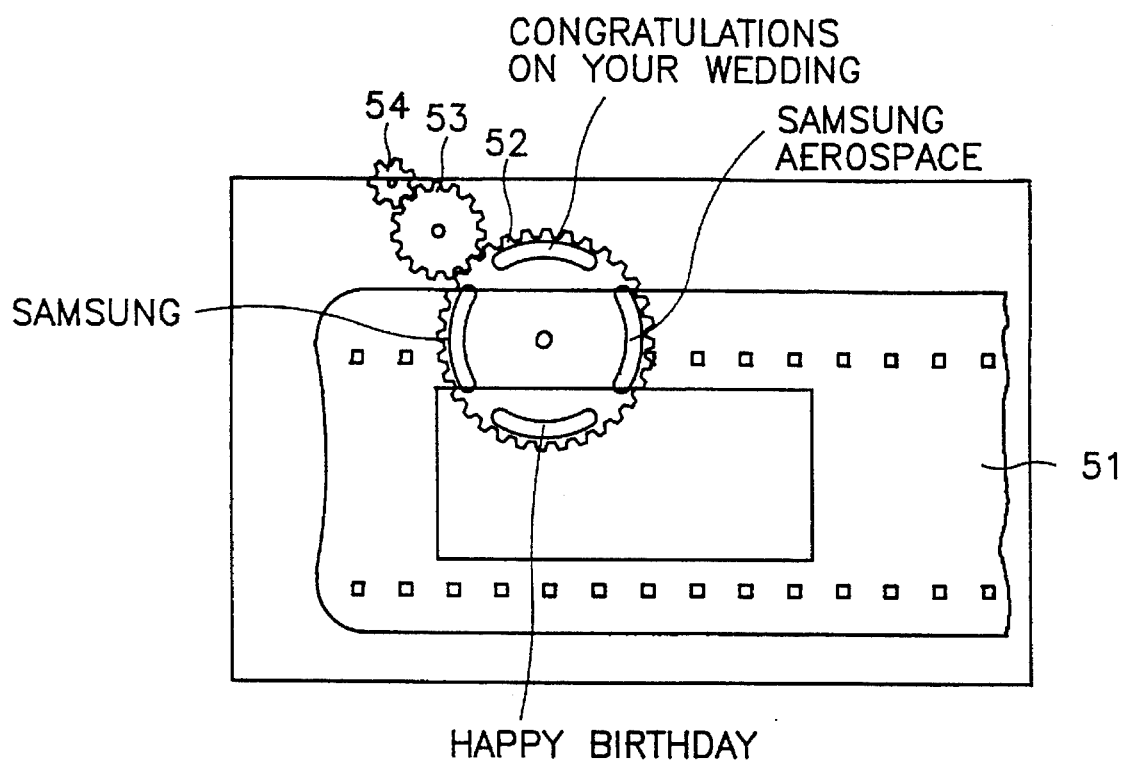
FIG. 5 illustrates a partial schematic view of a character imprinting device which can be manually actuated from outside a camera body in accordance with the invention.

Referring to FIG. 5, in still another embodiment, the character imprinting device may be constructed so as to be manually operated from outside a camera body. In this embodiment, the imprinting device has a data display plate 52 which is rotatably mounted in the body of the camera with a portion thereof in front of a film path for passage of a length of film 51 within the camera body. The rotatable plate 52 is disposed so as to expose characters thereon to a portion of the film in the path. As indicated, there may be four or more sets of characters or indicia on the rotatable plate 52. In addition, a rotatably mounted transmission gear 53 is in meshing relation with the data display plate 52. In this respect, the display plate 52 is formed with gear teeth on the outer surface to mesh with the transmission gear 53. In addition, an outer rotary plate 54 is rotatably mounted in the camera body with a portion extending from the camera body for manual engagement thereof. This outer rotary plate 54 is in meshing engagement with the transmission gear 53. Thus, upon rotation of the outer rotary plate 54, the transmission gear 53 transfers a rotary motion to the data display plate 52 so as to select one or another of the sets of characters on the plate 52.

During use, a user can confirm the selected character combinations through a specially designed window (not illustrated). When confirmation is obtained of the desired characters, a shutter can be actuated. As a result, the user obtains a photograph on which the desired characters are imprinted.

The data display plate 52 may be made of various colors of transparent materials on which various colors of transparent materials on which various colors of translucent characters are printed. Also, as above, the plate 52 may be made of an opaque material on which colors of transparent characters are printed or may be made of a transparent material on which transparent characters of different colors from the plate are imprinted.

Figure 6:
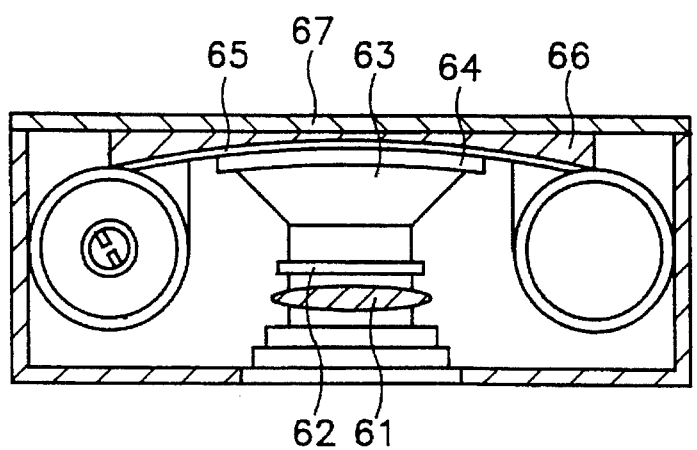
FIG. 6 illustrates a part cross-sectional view of a camera having a character imprinting device of still another embodiment in accordance with the invention.

Referring to FIG. 6, the character imprinting device may also be constructed to cooperate with a lens 61 and an exposure unit 62 of a camera which is located behind the lens 61. As indicated, a guide 63 is connected to the exposure unit 62 to form a path for the light passing therefrom to a film (i.e. a film strip) 65. In addition, a data display plate 64 is disposed in front of the film 65 and is as large as or larger than the film area to be exposed. A film presser 66 is also provided on the opposite side of the plate 64 from the film 65 while a rear cover 67 of the camera serves to block out light while pressing the presser 66 against the film 65.

As above, the data display plate 64 may be made of transparent materials, such as transparent plastic or glass while the characters or symbols are made of various colors of transparent material.

Both sides or one side of the data display plate 64 may be attached to the camera body by way of attaching materials.

Figure 7:
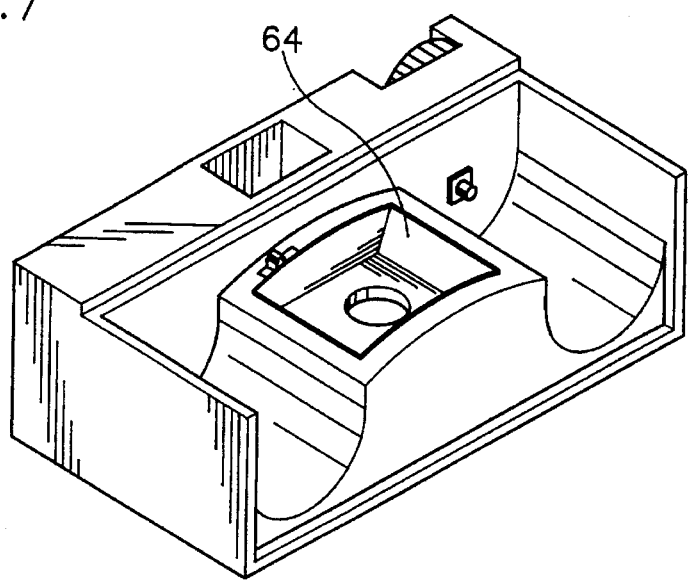
FIG. 7 illustrates a perspective view of the camera of FIG. 6 in an opened condition to illustrate the data display plate mounted therein.

When a user intends to imprint certain data, the user opens the rear cover 67 of the camera and attaches the data display plate 64 to the camera body by way of attaching materials, such as double sided adhesive tapes referring to FIG. 7. A film is then inserted behind the data display plate 64 and the rear cover 67 is then closed. The film 65 is thus pressed by the film presser 66 attached to the rear cover 67 in order to imprint an image of an object on the film 64 distinctly.

Thereafter, if a shutter switch (not shown) is turned ON, the various colors of data as well as an image of an object are imprinted on the film 63 by the light dimmed properly by the exposure unit 62.

As this time, because the film 65 locates about the focus of the lens 61, the farther the data display plate 64 is disposed from the film 65, the dimmer the data is imprinted. Hence, the data display plate 64 should be disposed close to the film 65.

As noted above, lest the outline of the data display plate 64 become imprinted due to the difference of transmission in response to the quality of materials composing the data display plate 64, the plate 64 should be at least as large as one frame of a film.

Figure 8:
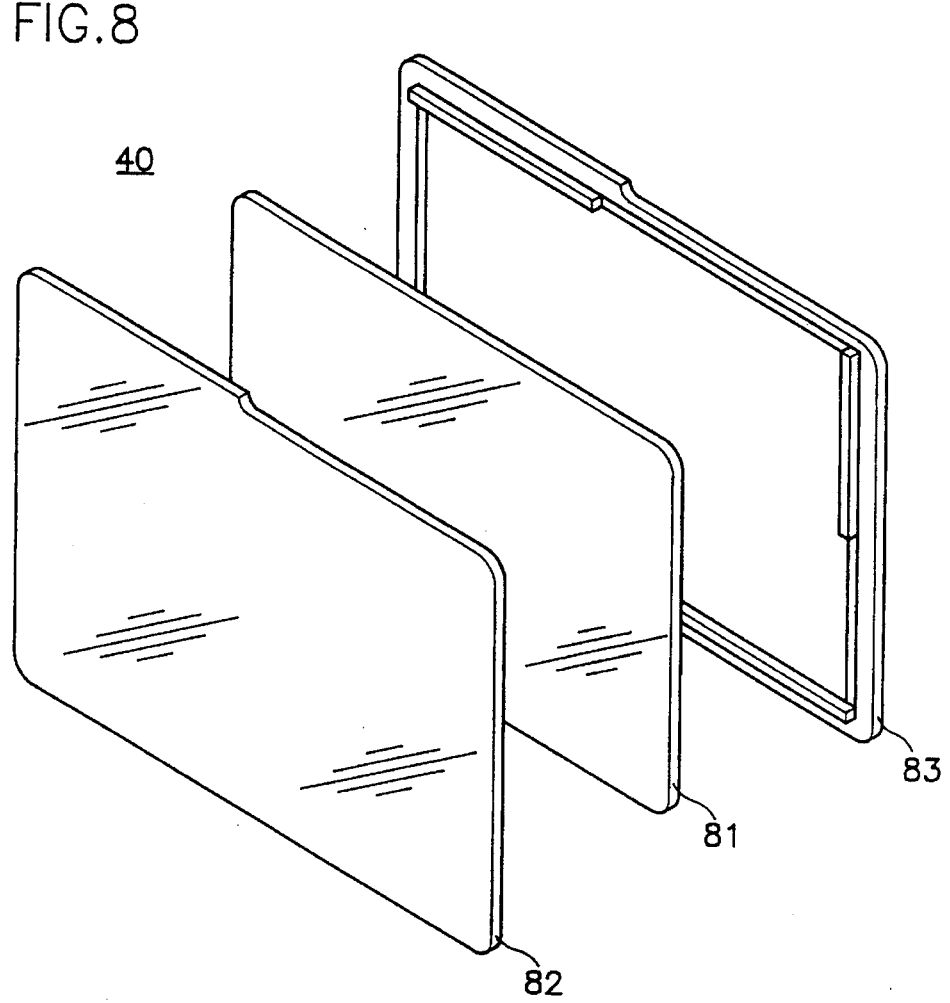
FIG. 8 illustrates an exploded view of a data display plate and a carrier for mounting the plate therein in accordance with the invention.
Figure 9A:
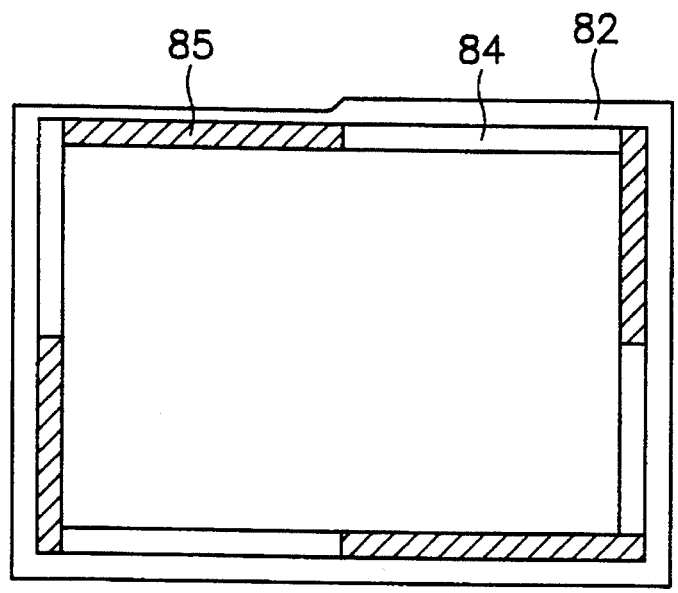
FIG. 9A illustrates a rear view of the carrier of FIG. 8.
Figure 9B:
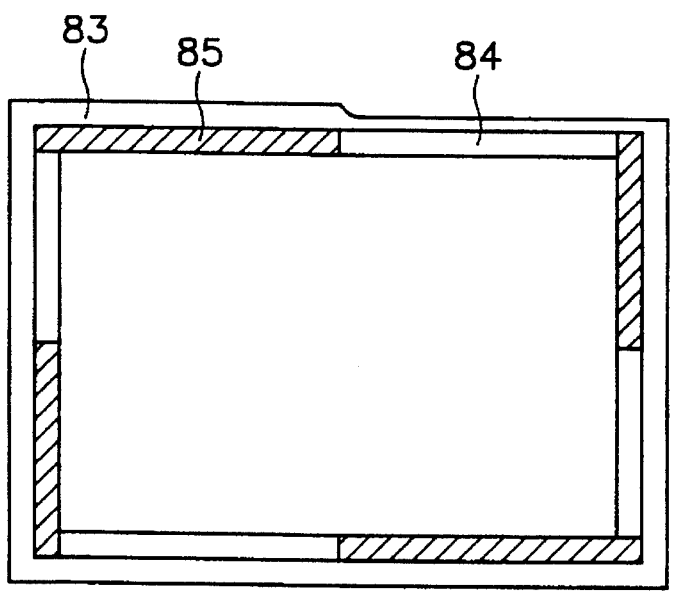
FIG. 9B illustrates a front view of the carrier of FIG. 8.

Referring to FIGS. 8,9a and 9b, a data display plate 81 may be mounted in a carrier 40 so as to be protected against damage. As indicated, the carrier 40 is composed of a front cover 82 of transparent material and a rear cover 83 of transparent material. These two covers 82,83 are provided with an alternating arrangement of projections 85 and recesses 84 so that the covers 82,83 can be brought together with the projections 85 and recesses 84 interengaging with each other in order to secure the colors 82,83 together with the data display plate 81 sandwiched therebetween. The two covers 82,83 may be made of any suitable transparent material, such as a transparent plastic.

When a user intends to imprint a certain pattern of characters or symbols on a photograph, the data display plate 81 is located between the covers 82,83 and the covers 82,83 secured together. Thereafter, as with the embodiment illustrated in FIG. 6, the rear cover 67 of a camera is opened and the data display plate carrier 40 is inserted within the camera. Thereafter, the cover 67 is closed and, by pressing a shutter switch, the data of the plate 81 is imprinted on the film 65.

The data display plate carrier 40 serves to keep the data display plate 81 clean and permits ready transport of the plate 81. Further, a user may chose data plates having different characters thereon for mounting in the carrier 40.

Figure 10:
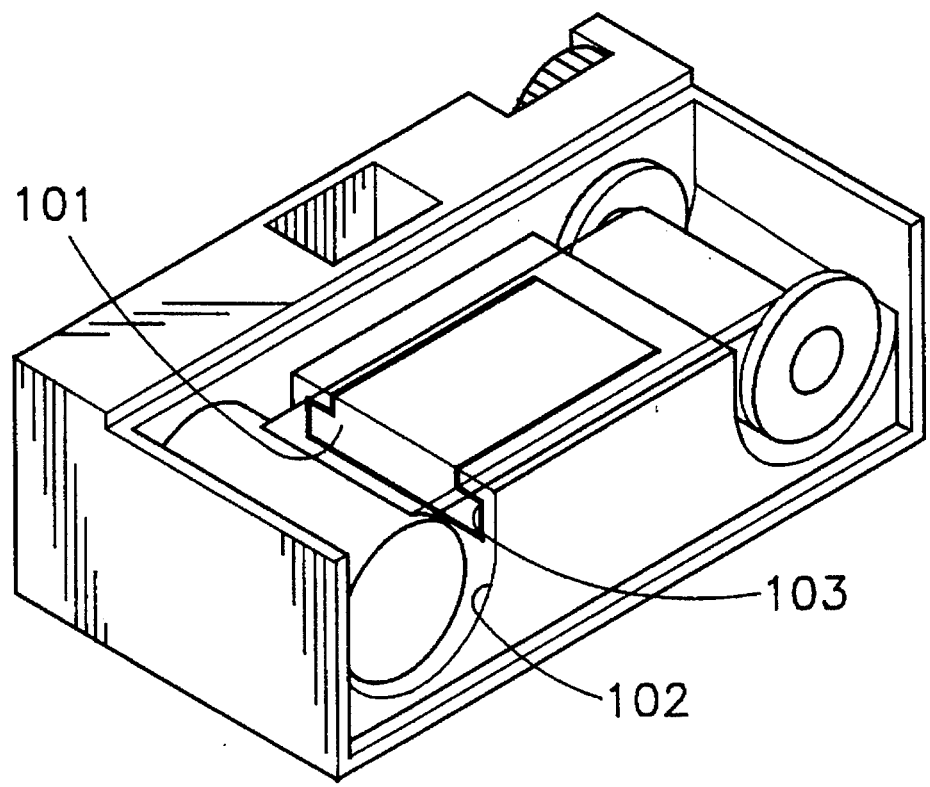
FIG. 10 illustrates a schematic view of another embodiment of a character imprinting device constructed in accordance with the invention.

FIG. 10 illustrates a schematic view of another embodiment of a character imprinting device constructed in accordance with the invention.

Referring to FIG. 10, a groove 103 is formed for a data display plate 101 to be inserted or removed in a predetermined portion of a camera body 102 in this embodiment of the character imprinting device. At this time, one end of the groove 103 may be closed or opened.

The operation of the character imprinting device in accordance with the above-mentioned construction as shown in FIG. 10 is as follows.

The user selects the necessary data display plate 101, opens a back cover of the camera, inserts the data display plate 101 into the groove 103 and takes the photograph of the object.

When the photographing is finished, the user removes the data display plate 101 from the groove 103. And the user mounts the data display plate including a new necessary data into the groove 103 again, so that the necessary character can be imprinted on the film.

The groove 103 is formed toward an advance direction of the film in this embodiment, but may be formed to be perpendicular to the advance direction of the film.

In case of closing one end of the groove 103, the other end can be fixed by an adhesive agent after inserting the data display plate 101 into the groove 103.

The effect in accordance with the above-mentioned embodiment is that the data display plate can be easily assembled in case that the data display plate 101 is inserted into the groove 103, and the data display plate 101 is not bent and is not reversely assembled.

The invention thus provides a character imprinting device which makes it possible to take photographs on which various colored characters may be imprinted.

Further, the invention provides a character imprinting device which is of economical construction.

Because a data display plate can be inserted in front of a film, the desired data is imprinted distinctly from the front surface of a film where a photographic emulsion is coated.

Further, because incident rays are adjusted properly in response to film sensitivity by an exposure unit composed of a diaphragm and a shutter, a circuit is not required to control the exposure time and quantity. As a result, the cost of using a character imprinting device in accordance with the invention is reduced.

Further, because it is possible to imprint various colors of characters, the character imprinting device provided by the invention is very useful for disposable cameras, i.e. film builting cameras, or photographs for sale promotion.

What is claimed is:

1. A character imprinting device for a camera comprising;
   a light emitting means for emitting light in response to an actuation signal;
   a carrier connected to a rear cover of a camera and mounting said light emitting means thereon;
   a film presser for guiding a photographic film in a path to be exposed to a light emitted from said light emitting means;
   a mask support member connected to said film presser for receiving a light emitted from said light emitting means;
   a shading means located between said carrier and said mask support member for shading a space between said carrier and said mask support member for outside light; and
   a stationary character imprinting mask removably mounted on said support member between said film presser and said support member to receive the light emitted from said light emitting means, said mask being of plate shape and having one or a plurality of colored characters printed thereon for imaging onto said film in response to actuation of said light emitting means.

2. A device as set forth in claim 1 wherein said carrier and said mask support member each has surfaces covered with grooves to prevent the light from said light emitting means from reflecting irregularly.

3. A character imprinting device for a camera comprising:
   a lens for focusing an image;
   an exposure unit for adjusting the exposure quantity and time of a light entering through said lens for passage to a film;
   a data display plate at least as large as an area of film to be developed having one or a plurality of characters thereon for selective exposure to the film; and
   a carrier receiving said data display plate therein, said carrier including a front cover of transparent material and a rear cover of transparent material secured to said front cover with said data display plate sandwiched therebetween.

4. A device as set forth in claim 3 wherein said covers have interengaging projections and recesses for securing said covers together.

5. A device as set forth in claim 3, wherein said data display plate is made of transparent material with characters of various colors thereon.

* *. * * *